United States Patent [19]

Popp et al.

[11] 4,425,651
[45] Jan. 10, 1984

[54] ION LASER WITH GAS DISCHARGE VESSEL

[75] Inventors: Hanns-Peter Popp, Hattingen; Friedrich Pfeil; Eberhard Schmidt, both of Bochum, all of Fed. Rep. of Germany

[73] Assignee: W. C. Heraeus GmbH, Hanau, Fed. Rep. of Germany

[21] Appl. No.: 302,831

[22] Filed: Sep. 16, 1981

[30] Foreign Application Priority Data

Sep. 25, 1980 [DE] Fed. Rep. of Germany ....... 3036112

[51] Int. Cl.³ .............................................. H01S 3/03
[52] U.S. Cl. ...................................... 372/61; 372/56; 372/34; 372/69
[58] Field of Search ...................... 372/55, 56, 61, 76, 372/89, 69, 34, 35

[56] References Cited

U.S. PATENT DOCUMENTS 3,585,524  6/1971  Silfvast ................................. 372/56
3,624,548 11/1971  Sosnowski ........................... 372/56

OTHER PUBLICATIONS

"Excitation Mechanism of 3250 and 4916Å Laser Lines in the Gataphoretic He–Cd Laser Discharge, ", Miyazaki et al., *Jap. Jour. of App. Phys.*, vol. No. 11, 1974.
"Investigation of a Helium–Cadmium Ion Laser with a Hollow-Cathode", Dozsa et al., *Soc. Jour. Quant. Electron*, vol. 4, No. 4, Oct. 1974.

*Primary Examiner*—James W. Davie
*Assistant Examiner*—Léon Scott, Jr.
*Attorney, Agent, or Firm*—Frishauf, Holtz, Goodman & Woodward

[57] ABSTRACT

An ion laser with a gas discharge vessel, for example a helium-selenium ion laser, utilizing cataphoretic vapor transport provides monochromatic exit radiation in a parallel beam of high intensity. The discharge takes place in a tube of high silica glass surrounded at some spacing by an envelope tube that is subject to cooling and is therefore gas-tight for helium. The envelope tube has a configuration or partial partition that provides condensation chambers for the vapor. Advantages are increased power especially for compact and short configurations, with high reliability, safety, and service life.

18 Claims, 10 Drawing Figures

ION LASER WITH GAS DISCHARGE VESSEL

This invention concerns an ion laser that includes a gas discharge vessel, especially one operating with a helium gas discharge and a metal vapor in which there is a cataphoretic vapor transport.

BACKGROUND AND PRIOR ART

In the periodical *Applied Physics Letters,* Volume 8 (1966), No. 12, pages 318–319, a pulsed metal ion laser is described by Silfvast, Fowles, and Hopkins, which operates with the metals cadmium, zinc, germanium, tin, lead, and indium as active laser materials in vapor form with a pulsed electric discharge.

Silfvast further described in *Applied Physics Letters,* Volume 15 (1969), No. 1, pages 23–25, a continuously operating ion laser with cataphoretic transport of the vapor of the elements cadmium, tin, and zinc. For excitation a continuous gas discharge in helium at a few mbar of pressure is used.

The continuously operating cataphoretic ion laser with the material selenium, that emits up to 24 laser lines in the visible region of the spectrum, made public by Silfvast and Klein in *Applied Physics Letters,* Volume 17 (1970), No. 9, pages 400–403, seemed particularly attractive. In this device a discharge vessel was used which made use of a discharge capillary of an inner diameter 4 mm made of pyrex glass and having a length of 1 m. For the strongest selenium ion laser lines at 522 nm an amplification of 5.4% per meter was measured.

After these first scientific publications it was sought to develop the cataphoretic metal ion laser further, to provide technically usable products. Heretofore, however, particularly for helium-selenium lasers, no industrially produced lasers were available that had adequate reliability of operation and a sufficient service life.

Above all two problems substantially impeded the development of the metal ion laser on the scale of industrial production:

1. The vapor stream produced by cataphoresis is not completely condensed at the cathode-side end of the discharge capillary and the vapor precipitates out on the exit window such as, for example, on a Brewster window. The internal losses are thereby greatly raised and the laser power thereby sinks steeply. The vapor stream can also reach the cathode where it greatly reduces the thermal emission (e.g. with selenium) and destroys the commonly used oxide cathodes.

2. The second problem concerns a great loss of the gas component of the gas-vapor mixture. Since for atomic reasons helium is preferably used as the gas for exciting the laser vapor, and helium unfortunately diffuses very easily through hot discharge capillaries, a strong helium pressure loss results and thereby also a rapid decrease of the laser power.

Heretofore, for raising the laser power, it was above all recommended to increase the active volume, here especially by prolongation of the discharge tube. Another theoretically conceivable way would be the raising of the discharge current density of the active medium: the required current densities for this purpose are not, however, adequately controllable and, moreover, the above described problems occur.

SUMMARY OF THE INVENTION

It is an object of this invention to provide an ion laser having a gas discharge vessel and capable of operation at increased laser output power, especially in the form of monochromatic radiation issuing from the device as a parallel beam of higher intensity, and more particularly a device using a relatively short active length (relatively small volume), and adequate amplification factor, which means a substantial power improvement. It is a further object of the invention that such a laser should have a high reliability in operation and a long service life and overcome the problems above described that have stood in the way of the industrial production of such lasers.

Briefly, the discharge tube is made of high temperature resistant (refractory), vapor-tight material such as quartz glass, high silica glass or glass ceramic, and is connected with the container that supplies the metal and generates vapor, the electrode containers and the exit tubes or endpieces and is surrounded at least in the region of its active length by a coolable envelope tube spaced from the discharge tube and made of a material of the same or similar thermal expansion coefficient as the discharge tube. One or more condensation chambers are provided in the envelope tube so that between the discharge tube and the cathode a discharge reversal takes place and condensation of the transported vapor takes place in the direction of a cathode-side exit window and over to the cathode.

The metal in the supply or vapor generating container is preferably either one of the group consisting of cadmium, lead, and tin, or else selenium or tellurium, which provide vapors that for the purpose of this invention may be regarded as metal vapors. The inner diameter of the discharge tube is preferably between 0.7 and 2.0 mm and may conveniently be 1 mm. The active length of the discharge tube should be between 50 and 1000 mm and preferably between 80 and 120 mm.

While the discharge tube is preferably made of quartz glass, the preferred material for the envelope tube is borosilicate glass.

It is also advantageous for the envelope tube to have several outer or inner constrictions or diaphragms separating the condensation chambers from each other, preferably of a kind which can be cooled from the exterior, preferably by means of air.

Preferably the inner diameter of the envelope tube is in the range between 10 to 40 times the inner diameter of the discharge tube.

It is advantageous to provide cooling metal sheets or foils of a suitable configuration located between the envelope tube and the discharge tube.

Preferably a cathode chamber and an anode chamber are connected with the envelope and between these two chambers a vessel is disposed for supply of vaporizable material, equipped with a heater for melting the material. The vessel can be arranged for operation in any position of rotation about the axis of the discharge tube or, indeed, for operation in any physical position of the device. The anode can advantageously be constituted in cylindrical form, bounded by glass to metal transitions at the ends thereof. The envelope also is advantageously constituted in substantially cylindrical shape and can be provided with a cold cathode.

At the two ends in the direction of the axis of the discharge tube, whch is also preferably the axis of the envelope tube, endpieces with exit tubes and exit windows, preferably Brewster windows, are connected with the envelope tube and/or the discharge tube. Resonator mirrors with and without one-way amplification can be provided in the neighborhood of the exit tubes.

The various features above mentioned can be used in various combinations and subcombinations among each other and with features of heretofore known devices not above mentioned.

By means of the invention it is possible even with a short laser (short active length) to operate with higher flow densities of the medium. This is made possible on the one hand because the construction according to the invention reduces or avoids the condensation of the cataphoretically transported vapor in the capillary and instead causes the condensation to take place where it is desired. The discharge tube, moreover, is contained in a relatively cool envelope tube that has very small helium leak losses. These losses are negligible even over a service life of over 3,000 hours. The amplification factor of the laser, which according to the invention can be constituted, for example, with a discharge tube (capillary) of an inner diameter of only 1 mm was measured at 113per meter, compared with 5.4% per meter in the case of Silfvast. This substantial power increase for raising of the amplification factor makes it directly possible by means of the invention to shorten considerably the active length of the gas discharge and thereby to provide new areas of application for the laser. The density of the flow of the medium or of the vapor, which lies between 0.1 and 1.0 mg per hour in the case of the invention, is nevertheless subject to good control. The helium-selenium ion laser according to the invention has the great advantage that the 5 to 24 laser lines are all simultaneously amplified optically.

BRIEF DESCRIPTION OF THE DRAWINGS

The invention is further described by way of illustrative example with reference to the annexed drawings, in which.

DESCRIPTION OF THE ILLUSTRATED EMBODIMENTS

The invention is now described with reference to a small helium-selenium adjustable laser for continuous operation for laboratory purposes, but of course the invention is in no way limited to lasers of this particular kind or for these particular purposes. Thus the laser of the invention can also be operated with periodic pulsing and instead of the helium-selenium laser emitting principally in the green, a helium-cadmium laser, for example, can be used which emits in the blue and in the ultraviolet.

Figure 1:
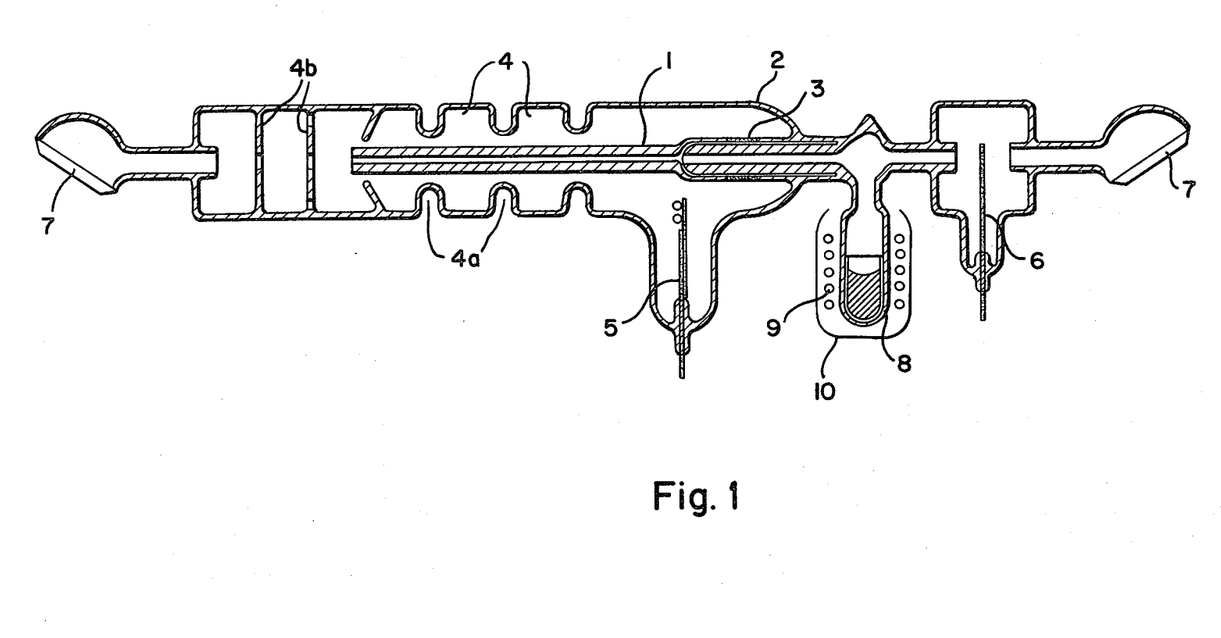
FIG. 1 is a diagrammatic longitudinal section of an ion laser according to the invention.

As is shown particularly in FIG. 1, the vessel for discharge consists of a tube 1, in particular a high temperature resistant capillary, made of glass of high silicic acid content, of quartz glass or glass ceramic, which takes up the discharge heat. The inner diameter of the discharge tube lies in the region from 0.7 to 2 mm preferably in the region of about 1 mm The active length can lie in the region between 50 and 1000 mm but preferably the region is about 100 mm long, especially for the above described purpose of the HeSe laser, which nevertheless puts out 3 mW of power with a discharge tube of an inner diameter of only 1 mm For lengths of 1000 mm and an inner diameter of the discharge tube (capillary) of 2 mm a total power output of over 150 mW is obtained compared with 30 mW in the previous state of the art.

As is clear in FIG. 1 the discharge tube 1 is surrounded on all sides and essentially concentrically by an envelope tube 2 of large diameter which is subject to only a small rise of temperature and has an excellent impermeability to helium because it is made of borosilicate glass (hard glass) that is preferred for this purpose for this purpose. The thus likewise enlarged helium buffering volume brings about a prolongation of the service life.

Figure 2:
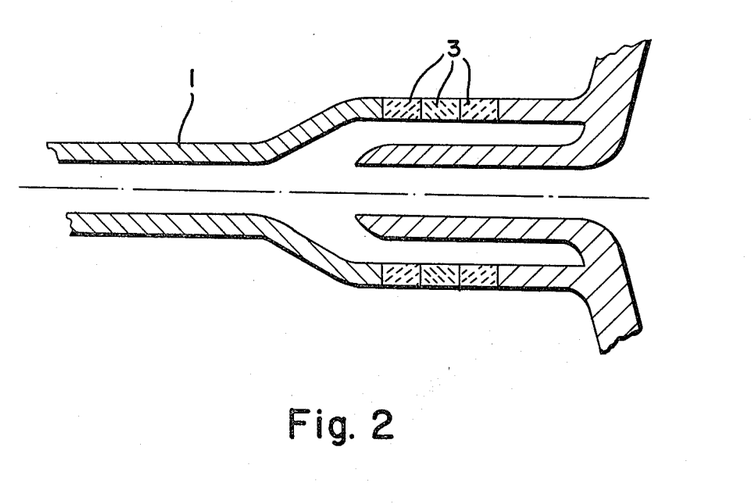
FIG. 2 is a detail of a transition portion at the joints of the discharge tube and the envelope tube, likewise in longitudinal section.
Figure 3:
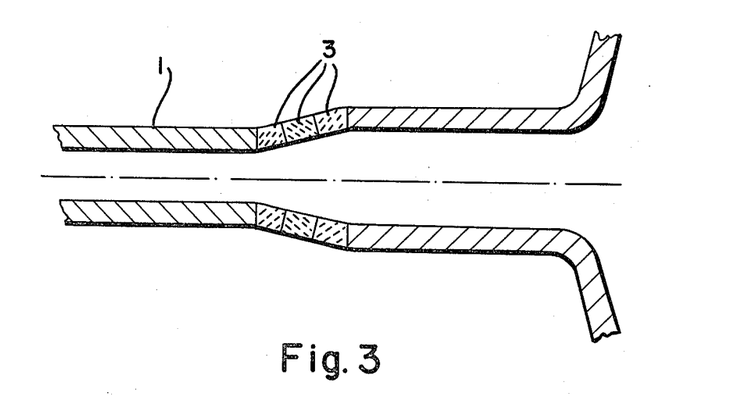
FIG. 3 is a section of a modified transition portion similar to FIG. 2.

The connection between the discharge tube of high-temperature resistant material, such as quartz glass, and the envelope tube can be provided by transition glass elements 3 (FIGS. 2 and 3). By transition glass elements are understood glass inserts provided in several pieces between the two parts (discharge tube and envelope tube) that are to be fused together such that the difference in thermal expansion coefficient of the parts to be connected gradually approach each other in small steps. The envelope tube is also connected to the respective electrode chambers of the cathode 5 and the anode 6 and to a supply chamber 8 that serves also as a melting vessel and is surrounded by an oven 10 and electric heating winding 9.

One or more condensation chambers 4 of large diameter that can be cooled from the exterior serve for condensation of the cataphoretically transported vapor that is produced in the discharge tube. The condensation chambers, preferably several of them, are disposed in the direction towards the exit window at the cathode side and in the direction towards the cathode. When a cold cathode is used (FIG. 8) they can in part be omitted.

The condensation chambers 4 are advantageously formed from constrictions for 4a (external cooling grooves or ribs) and in other cases by diaphragms 4b in the envelope tube 2 or apertures in partitions of the envelope tube. The cooling from outside the envelope tube can be air-cooling or water-cooling; in the first case a blower (not shown) is used for the purpose that blows against the outer wall of the envelope tube to cool it, and in the second case, a ring conduit such as a spiral, through which a cooling medium such as water flows, is disposed (not shown) within each of the constrictions 4a.

Figure 6:
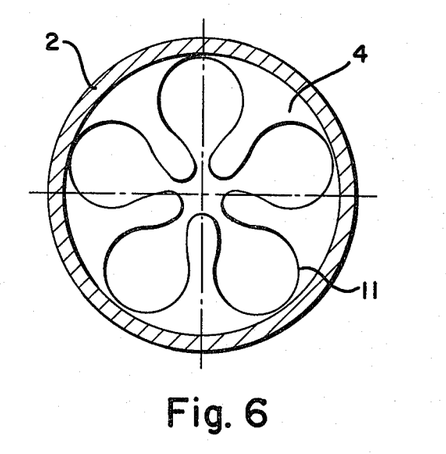
FIG. 6 is a section transferred to the axis of the device through a metal sheet cooler in a condensation chamber of an ion laser according to the invention.

Instead of the diaphragm or constrictions in the envelope tube 2 there can also be inserted within the tube a material having good heat conduction, preferably a metal sheet member 11, for better cooling and condensation of the metal vapor. A configuration of sheet metal folded around at the periphery where it touches the envelope tube (FIG. 6) and also reversely against the capillary, so as to have a star-shaped cross-section, has been found particularly effective. Such a sheet metal member may run along the entire length of the discharge tube 1 and if desired can extend beyond it. The shape of the sheet metal must take account of the desired vapor flow density and should not in the least impede it.

Figure 4:
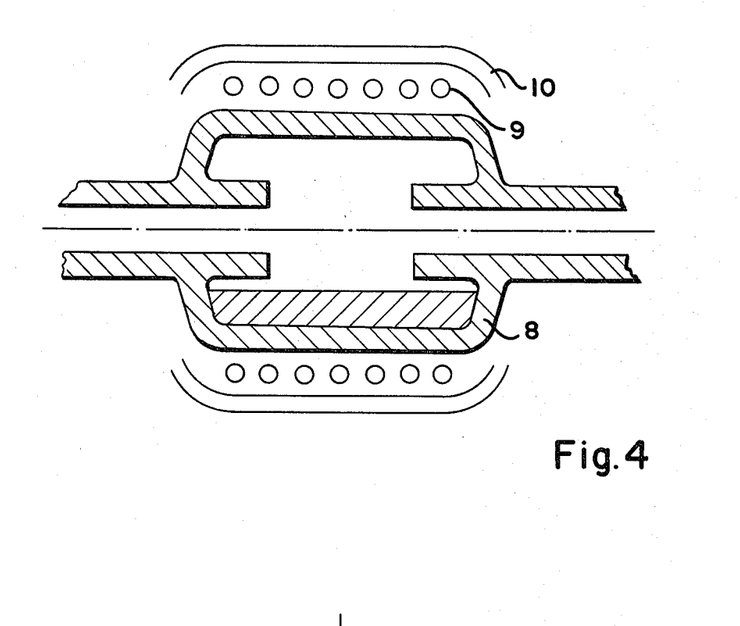
FIG. 4 is a longitudinal section of a supply vessel, with heater, that may be used in any position.
Figure 5:
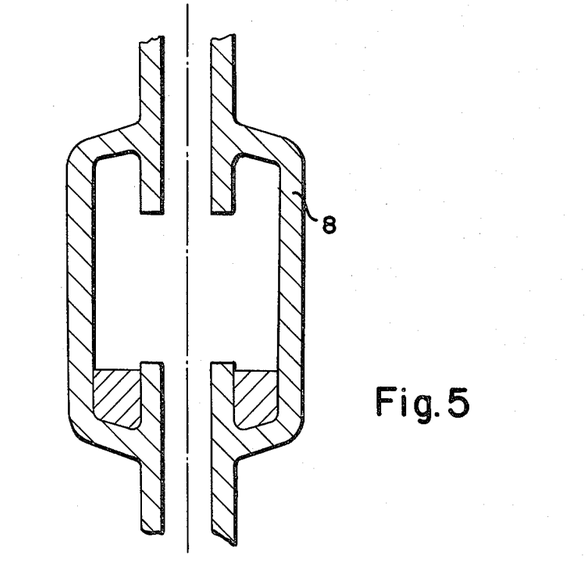
FIG. 5 is a longitudinal section of a supply vessel similar to that of FIG. 4 standing in a different position.

The active laser material to be vaporized, such as selenium, cadmium, tellurium, tin, lead, zinc, germanium, or indium is contained in a supply chamber 8 which is either brought out laterally from the glass tube 2 as shown in FIG. 1 or is disposed cylindrically around the discharge tube 1 coaxial therewith (FIGS. 4 and 5). In the last mentioned configuration the melting operation is independent of position (see FIG. 4 for a horizontal and FIG. 5 for a vertical one). The electric heating winding 9 or the oven 10 can be of a conventional kind.

Because as shown in FIGS. 4 and 5 the glass tube ends of the discharge tube 1 extend for a certain distance into the chamber 8 sufficient to contain a maximum amount of the melt in the vertical position shown in FIG. 5, the melt remains in the annular space beyond the diameter of the discharge tube 1.

Figure 7:
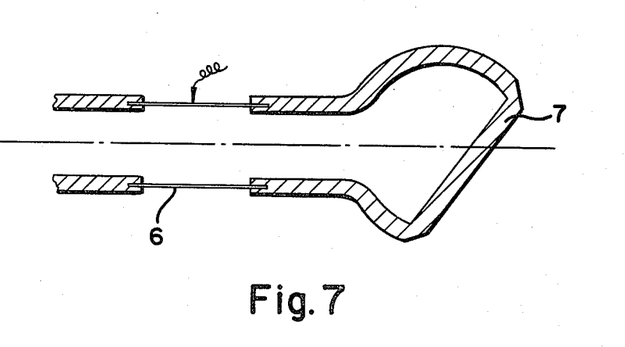
FIG. 7 is a longitudinal view of a portion of a modified laser according to the invention showing a cylindrical anode.
Figure 10:
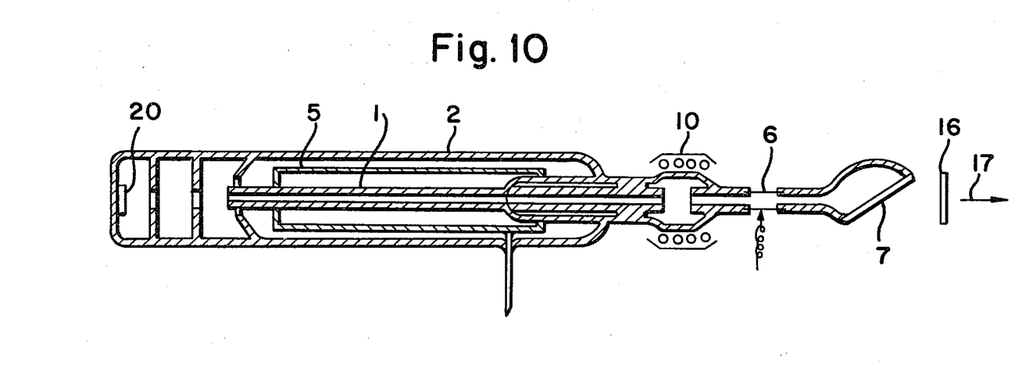
FIG. 10 shows a laser tube similar to that of FIG. 8.

The anode 6, instead of being provided as shown in FIG. 1, can also be constituted as a ring anode, as shown at FIG. 7 where it has a glass-to-metal bond seal at each end of the cylindrical anode. This had the advantage that the entire device can be of tubular design. As shown, both in the embodiment according to FIG. 7 and in the embodiment according to FIG. 1, so called Brewster windows 7 are provided. Of course, other kinds of exit windows can all be used and, furthermore, mirrors or partial mirrors can be utilized for the resonator, also within the envelope tube, as shown in FIG. 10.

Figure 8:
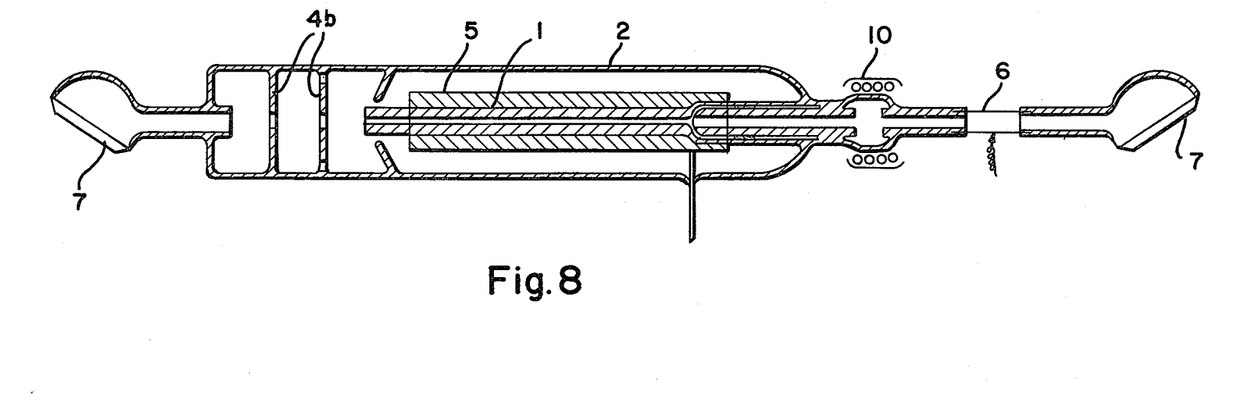
FIG. 8 is a longitudinal section through another embodiment of an ion laser according to the invention, equippped with a cold cathode.

FIG. 8 shows an embodiment having a cold cathode of aluminum or nickel which is disposed coaxially around the discharge tube.

Preferred electrode materials are, in the case of a heated cathode, metal oxides having good emission properties, particularly oxides selected from the group consisting of calcium, barium, strontium, and thorium oxides. For the cathode substrate, as well as for the anode, a high melting metal, such as tungsten, molybdenum, or the like, can be used or composite alloys of these metals.

One model has been successfully tried out which had a quartz glass capillary as discharge tube and a borosilicate glass (hardglass) envelope tube, both with wall thicknesses in the region of about 5 mm; the capillary inner diameter may be in the region of 1 mm (up to a maximum of 2 mm). The cooling pressure of the helium was (for a capillary of 1 mm) in the region of about 10 to 30 mbar, preferably 20 mbar, and the current densities in the region of about 100 to 200 mA. For higher powers higher current strengths can of course be used. The vapor stream flow density was in the neighborhood of about 1 mg per hour (when selenium was vaporized at an oven temperature in the region of about 200° to 300° C., usually about 265° C.).

Modifications of the above embodiments and examples can of course be made without departing from the frame of the invention.

Since the preferred helium-selenium laser emits light in the green portion of the spectrum, laser powers around 1 mV are readily visible even in daylight. This adequate low power thus increases the radiation protection for the human eye. This laser has advantageously six green laser lines between 497 and 530 nm. It can be used both in multimode operation and also in single mode operation.

Figure 9:
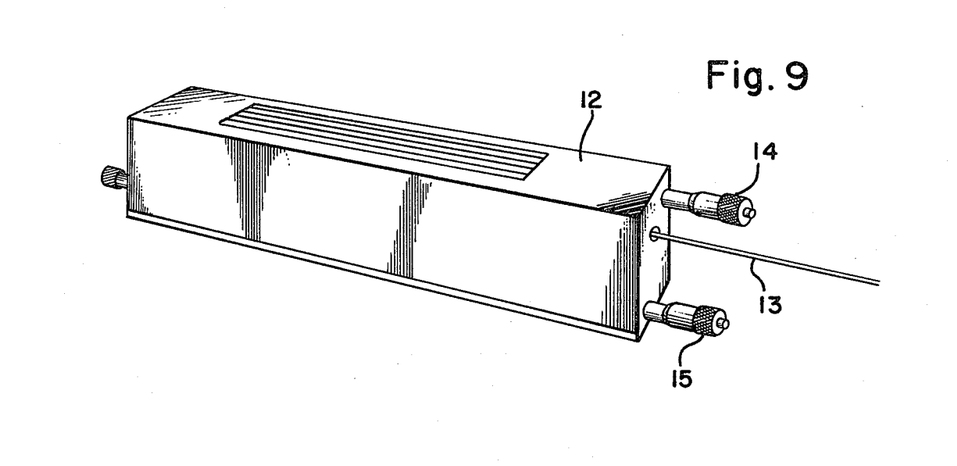
FIG. 9 is a perspective view of a laser apparatus of the invention in its ventilated protective casing.

In particular, the small and handy configuration of the laser apparatus, including cooling in a casing, as shown in FIG. 9, results in a whole series of interesting possibilities of application:

in schoolteaching, for demonstration of optics, particularly dispersion;
for adjustment purposes without protective glasses (powers about up to 1mW, preferably in single mode operation);
utilization in geodesy and in surveying;
pilot line for retina coagulation, and for $CO_2$ laser surgery;
radiation source for dermatology;
gas stream velocity measurements by the Doppler method (for three dimensions, for example, three separate wavelengths are used);
particle size analysis, particularly light scattering measurements in gases and liquids for determination of the scattering particles size;
measurement of the surface roughness of bodies

Dimensions for Example of FIG. 1

Discharge tube: ca. 12 mm external diameter
Capillary end to cathode: ca. 100 mm long
Envelope tube: ca. 50 mm inner diameter
Envelope tube: ca. 250 mm long
Window to window mid-spacing: ca. 450 mm
Anode to cathode spacing: ca. 125 mm
Spacing from anode to middle of melting vessel: ca. 50 mm
Spacing anode to mid-window: ca. 75 mm
Spacing cathode to mid-window: ca. 250 mm In the example of FIG. 9 cooling air passes in through slits in the casing 12 in which the laser tube is mounted in fixed position. The laser beam 13 exits through a hole in the casing. Electrical connections are indicated at 14 and 15.

FIG. 10 shows a laser tube similar to that of FIG. 8 on which mirrors 15 and 16 are provided at the ends of the device to act as resonator elements in the usual way. The mirror 15 has 100% reflection, while the mirror 16 is semitransparent, allowing the output laser beam 17 to pass through.

We claim:

1. An ion laser of the gas discharge metal-vapor type with cataphoretic vapor transport, comprising:
   a gas discharge tube of refractory glass which is substantially impermeable to gas and vapor;
   an envelope tube surrounding said gas discharge tube at least in the region thereof in which a discharge takes place and made of a glass of a type selected for having a thermal expansion coefficient of a magnitude close to that of said refractory glass and having impermeability to gas at operating temperatures to which it can practically be cooled, said envelope tube being shaped to provide a plurality of interconnecting condensation chambers;
   a container vessel for material supplying vapor connected with said gas discharge tube and equipped with means for heating said material in said vessel;
   electrode chambers with electrodes therein and in communication with the interior of said gas discharge tube respectively by opposite ends of the latter, the cathode being an oxide cathode so located as to produce a reversal of the physical direction of the discharge between the interior of said discharge tube and the cathode, and hollow end pieces aligned with the ends of said discharge tube and spaced therefrom and communicating therewith, said condensation chambers being so located that condensation of cataphoretically transported vapor of said material takes place during transport of said vapor towards the cathode and towards the one of said end pieces nearer the end of said discharge tube with which said cathode chamber communicates, the interiors of said gas discharge tube, container vessel, electrode chambers and end pieces being all so interconnected as to maintain pressure therein below atmospheric pressure for providing laser operation capable of radiating a high intensity parallel laser beam out of one of said end pieces.

2. An ion laser as defined in claim 1 in which at least one of said end pieces is equipped with a Brewster window.

3. An ion laser as defined in claim 1 in which the connection of said container vessel through which said container vessel communicates with said discharge tube is interposed between said region of said discharge tube and the anode electrode chamber.

4. An ion laser as defined in claim 1 in which said material in said container vessel is selected from the group consisting of cadmium, lead, and tin.

5. An ion laser as defined in claim 1 in which said material in said container vessel is selected from the group consisting of selenium and tellurium.

6. An ion laser as defined in claim 1 in which said discharge tube has an inner diameter in the range from 0.7 to 2.0 mm.

7. An ion laser in claim 1 or claim 6 which said envelope tube is provided with a plurality of constrictions separating said condensation chambers from each other.

8. An ion laser as defined in claim 7 in which means for air cooling said envelope tube are provided which are external to said envelope tube.

9. An ion laser as defined in claim 7 in which the inner diameter of said envelope tube is not less than 10 times nor more than 40 times the inner diameter of said discharge tube.

10. An ion laser as defined in claim 1 in which said discharge tube has a region in which said discharge takes place of a length between 50 and 1000 mm.

11. An ion laser as defined in claim 10 in which said region of said discharge tube has a length between 80 and 120 mm.

12. An ion laser as defined in claim 1 in which said discharge tube is made of quartz glass and said envelope tube is made of borosilicate glass.

13. An ion laser as defined in claim 1 in which sheet metal cooling means for conducting heat from said discharge tube to said envelope tube are interposed between said envelope tube and said discharge tube.

14. An ion laser as defined in claim 1 in which the anode electrode is a metal cylinder sealed at its ends to glass portions of the ion laser.

15. An ion laser as defined in claim 1 in which said envelope tube is substantially cylindrical and holds a cold cathode in space enclosed between said envelope tube and said discharge tube.

16. An ion laser as defined in claim 1 in which said endpieces are composed of exit tubes, coaxial with said discharge tube and said envelope tube, and exit windows.

17. An ion laser as defined in claim 1 in which in the neighborhood of one of said endpieces and in the neighborhood of said envelope tube resonator mirrors are provided.

18. An ion laser as defined in claim 17 in which at least one of said resonator mirrors is provided with means for establishing one-way amplification.

* * * * *